Patented July 1, 1947

2,423,185

UNITED STATES PATENT OFFICE 2,423,185

PROCESS FOR THE MANUFACTURE OF COATED AND IMPREGNATED MATERIALS

Wolfgang Gündel and Ernst Götte, Dessau, Germany, assignors, by mesne assignments, to The Hydronapthene Corporation, Wilmington, Del., a corporation of Delaware No Drawing. Application July 3, 1940, Serial No. 343,834. In Germany July 8, 1939

15 Claims. (Cl. 117—161)

The present invention relates to coated and impregnated materials and to a process for the manufacture of coatings and impregnations on many kinds of materials and particularly on textiles.

The process generally consists in covering materials with aqueous solutions of basic compounds known also as amino compounds containing salt groups obtained by chemical reaction between said basic compounds with acids. After condensing the basic compounds containing salt groups to form resins, the resins are converted into an insoluble form. Thus on said materials coatings or impregnations may be obtained that are strongly adhering and fast.

It will be further noted that the resins containing salt groups used in carrying out this method will be obtained by jointly condensing oxo compounds, compounds condensing with oxo compounds to form resins, and salts of basic compounds which condense with oxo compounds to form soluble salt resins. But other similarly constituted resins with salt groups may likewise be applied provided they can be converted after the condensation into an insoluble form.

As mentioned herein at the beginning the present process relates in a preferred embodiment to the impregnation of textile materials, i. e. on cotton, linen, cellulose, artificial silk, wool, natural silk, artificial wool, in the form of threads, cords or tissues etc. According to the present process materials other than textiles, such as paper, cardboard, pasteboard, wood, artificial masses, leather, stone, etc., can be coated or impregnated also.

The impregnation is done in such a manner that aqueous solutions containing the resins with salt groups in concentrations of e. g. 0.5 to 5% are prepared and said materials are covered with these solutions either by steeping, immersing by spreading on, sprinkling, printing and by other impregnation methods. After the impregnation the materials are freed from the excess impregnating liquid and eventually dried, whereupon we continue with the operations to render the resin coatings insoluble.

The materials preliminarily impregnated with the water soluble resins of this invention may be treated subsequently with aqueous solutions of agents having a basic character such as solutions of oxides or hydroxides of the alkali-, earth alkali- or earth metals, solutions of strong organic bases and the like, whereby the resin bases are formed. In this case the basic agents of these treatment baths may form simultaneously insoluble compounds or salts with the acid radicals of the resin salts which insoluble materials are capable of embedding themselves into the resin coatings in the form of pigments. If the insolubility of the formed resin bases seems to be insufficient, a subsequent treatment with formaldehyde may be applied or higher molecular organic radicals may be introduced into the resin bases e. g. by acylating, converting with isocyanates and the like.

The insolubility of the resin coatings or resin impregnations can be obtained also by passing the preliminarily impregnated materials through baths containing soluble salts of acids which form insoluble salt resin upon reaction with the soluble salt resins by an exchange between the acid radical of the soluble salt resin and the acid radical of the soluble salts. As salts containing acid radicals to form insoluble compounds with the soluble salt resins, there may be named e. g. alkali sulfates, alkali chlorates, alkali perchlorates, alkali phosphates, alkali or earth alkali fluorsilicates, fatty acid salts, water soluble salts of organic sulfuric acid esters, water soluble salts of organic sulfuric acids and other anionactive soap substitutes.

The after treatment of the preliminarily impregnated materials is carried out in a usual way in treatment baths or also by a spreading on of the treatment solutions, whereupon the conversion is promoted by applying higher bath temperatures. If necessary any special chemical methods may be applied so as to effect more extensive chemical conversions on the amino groups of the resin bases hereinafter disclosed and used in accordance with the present invention.

By these impregnations or coatings the treated materials get strongly adhering resin coatings which are extremely fast particularly to alkali, so that they are to a high degre protected against attacks of an atmospheric or chemical nature. Further it is possible to impart to the materials a considerable improvement in their structure which depending upon the applied materials and the materials treated shows its effect in various directions. According to the present invention textile materials may have imparted to them dressings fast to washing and particularly filling dressings. Furthermore textiles can be revived if the after treatment is performed with a soap bath or with the aqueous solution of an anionactive soap substitute. In this manner insoluble resin salts are formed on the fibre containing anion radicals of fatty acids, etc., of the soap or soap substitute used on said fibers. In this way the treated textiles get a soft feel which is absolutely fast to washing. The textile materials may have mat-effects also produced by impregnating the textile fabric with a sulfuric resin salt and then subsequently treating by dipping in a bath containing dissolved barium hydroxide, or a soluble barium salt and then dipping in a bath containing diluted alkali lye. In this way an excellent mat-effect fast to washing is obtained, whereat the insoluble resin film contains the formed barium sulfate in finest distribution, which is of a high practical interest for the textile industry. With the aforementioned processes in certain cases any known dressing or reviving agents may be coemployed.

Another advantage resides in the fact that the textile materials, if the fixation of the resins is done by forming insoluble salt resins, acquire basic properties because of subsequent treatment with alkaline solutions and become woollike thereby permitting easier dyeing. On the other hand the process may also be applied to textiles dyed with substantive dyestuffs, in which case an enhancement of the fastness to water or fastness to bleeding of the dyeings is obtained.

Moreover this process may be applied for the production of printings and especially textile printings by adding to the printing pastes the artificial or synthetic resins containing salt groups from basic groups reacted with acids. The printing method is carried out in a known manner wherein, subsequent to the spreading on of the printing pastes, which may be standardized to the desired consistency by means of known neutral printing diluents, the printed materials are steamed, fixed and soaped. By this after treatment of the printed material the resins containing soluble salt groups are converted into insoluble form which on revived artificial silk provide a washing fast mat-effect.

Mixtures adapted for mat-printing and containing any known coloured or white pigments, can be produced, for example by emulsifying the pigment with an anionactive soap and precipitating the emulsion by adding an equivalent or somewhat perstoichiometrical amount of a cationactive soap. The resulting paste is introduced into the warmed concentrated solution of a resin of the aforesaid kind, preferably of its chloride, whereat the amount of the resin is proportioned advantageously so as to correspond more or less to the amount of the other auxiliary stuffs (anionsoap, pigment, cationsoap). This mixture represents, after cooling, a stiff paste which may be adjusted to the required consistency by means of the usual diluents such as glycerine, ethylene glycol and the like. Printing with this paste is done in the usual manner, whereupon the materials are steamed under pressure, are fixed with a diluted solution of Glauber's salt and soda or with an anionactive soap and are subsequently soaped while boiling in an alkaline soap bath.

The printing can be done with dyed or undyed goods whereby in each case special effects are obtained by the resins producing a mat-effect. These effects may still be enhanced by printing the undyed material or by treating the improved, treated goods with dyestuffs to produce mat and lustrous portions.

Other materials such as paper, paperboard and card board acquire, by applying the invented process, waterproof coatings or impregnations. Wooden articles may also be impregnated by this treatment, in which case they are protected against chemical and atmospherical influences, and particularly against rotting.

Example 1

In 1000 parts by weight of water while adding 15 parts by weight of concentrated hydrochloric acid, 10 parts by weight of a salt resin obtained by the condensation of 1 mol of dicyandiamide, 1 mol of guanylurea sulfate, 1 mol of guanylurea chloride and 4 mols of formaldehyde are dissolved. At a bath proportion of preferably 1:30 lustrous artificial silk or cellulose wool is treated with this bath for 15 minutes at 50° C. The material is then squeezed out or centrifuged, whereupon it is immersed and agitated for an additional 15 minutes at about 50° C. in a second bath containing 20 parts by weight of Ba(OH)$_2$ in 1000 parts by weight of water.

In this way the artificial silk gets a mat-effect absolutely fast to washing and at the same time a considerably fuller and softer feel.

Example 2

A waterproof cloth is treated in a solution of 20 parts by weight of a condensate of 1 mol of dicyanamide, 2 mols of guanylurea chloride and 4 mols of formaldehyde in 1000 parts by weight of water for about 20 minutes at 60° C. Then the material, when dried to such a degree to be still humid but not dripping, is immersed and agitated for a short time in a solution of 10 parts by weight of the sodium salt of the montanic acid in 1000 parts by weight of water at about 30° C., whereupon it is finished. By this treatment the waterproof cloth becomes fast to washing and at the same time water repellent.

Example 3

Cuproammonium silk rendered mat at the spinning process is brought for 10 minutes into a bath of 45° C. consisting of 1000 parts by weight of water and 10 parts by weight of salt resin made by the reaction of 1 mol of dicyandiamide, 2 mols of guanylurea chloride and 4 mols of formalin. After soaping with a solution of 3 parts by weight of Marseilles' soap, a commercial olive oil soap, in 1000 parts by weight of water the material has a full soft touch which is perfectly fast to washing.

Example 4

Thirty-three parts by weight of cellulose yarn are immersed and agitated for 10 minutes at 45° C. in a bath of 500 parts by weight of water, 5 parts by weight of a condensate of 1 mol of melamin, 3 mols of guanylurea chloride, 1 mol of hydrochloric acid and 1 mol of dicyanamide. Then for further 10 minutes the yarn is soaped at 30° C. in a bath consisting of 1000 parts by weight of water, 3 parts by weight of Marseilles' soap, a commercial olive oil soap, and 1 part by weight of soda. The thus prepared material can be dyed with quite acid dyestuffs such as alizarine pure blue FF, supranol orange GS and anthralane red BB under addition of glacial acetic acid in the same manner as with wool.

Example 5

Textile materials serving for decoration or as curtains are impregnated by spraying or spreading with an aqueous 33% solution of a condensate of 1 mol of dicyanamide, 2 mols of guanylurea chlorid and 4 mols of formalin. During the treatment the solution of this condensate is advantageously warmed up to 40–50° C. The impregnated textile material is dried at about 110°

C. or in the air, whereupon it is subsequently treated by a 1% solution of trisodium-phosphate. Then the material is dried. The thus obtained impregnation is fastly fixed on the fibre and it renders the textile material non-inflammable.

*Example 6*

Wooden articles are impregnated with a 33% solution of a condensate of 1 mol of dicyanamide, 2 mols of guanylurea and 4 mols of formalin. The impregnation may be performed either by an external coating or in a vacuum apparatus, whereby the solution of the condensate is advantageously warmed up to 50° C. After drying the articles are after treated with a waterglass solution of about 5 to 10° Bé. By this treatment the wood gets fireproof impregnated and the impregnation cannot be washed out by water.

*Example 7*

One hundred parts by weight of an aqueous solution of the sodium salts of alkyl sulfuric acids with 8 to 10 carbon atoms and about 15% of aliphatic alcohols are worked together with 250 parts by weight of zinc sulfide to form a paste. 40 parts by weight of this zinc sulfide paste are converted with 12 parts by weight of an aqueous solution containing about 35% of dimethylamino-aceticacid-dodecylester-chlor-methylate,

and the thus obtained paste is added to 104 parts by weight of a hot 50% solution of a resin obtained from 1 mol of dicyandiamide, 2 mols of guanylurea chloride and 4 mols of formaline. Then tetrahydrofurfuryl alcohol or ethylene glycol is added to get a viscous paste, which is printed on to the surface of a textile material and steamed as usual. Thereupon the printed material is passed broad through a bath containing 5 g. of soda and 5 g. of Glauber's salt for each liter. Now the material is soaped while boiling in a soda bearing soap bath in order to eliminate the non-fixed particles.

*Example 8*

A woolen cloth is brought for about 15 minutes into a bath warmed to 45° C. and consisting of 1000 parts by weight of water and 30 parts by weight of a salt resin obtained by condensing 1 mol of dicyandiamide with 2 mols of dicyandiamidine hydrochloride, $NH_2CNHHClNHCONH_2$, and 4 mols of formaldehyde while boiling for several hours. The material squeezed out and still moist is then moved in a 5% solution of sodium or magnesium silico-fluoride wherein the treatment is completed. By this treatment the woolen cloth has become fast to moths and keeps this property also after a repeated washing.

We claim:

1. A process for producing an improved coated and impregnated material comprising impregnating the materials with an aqueous solution at 50° C. of a water-soluble salt of a basic amine-aldehyde type resin composed of the condensation product of formaldehyde with dicyandiamide and with a preformed mineral acid salt of guanyl urea, and after the excess solution is removed chemically converting said applied resin into its water-insoluble state by removing the water solubilizing acid groups of the salt component of the resin.

2. A process for rendering textiles water-repellent and imparting other desirable properties thereto which comprises impregnating said textiles with a warm aqueous solution of a water-soluble salt of a basic amine-aldehyde type resin composed of the condensation product of about 4 mols of formaldehyde with about 1 mol of dicyandiamide and with about 2 mols of a preformed mineral acid salt of guanyl urea, and after the excess solution is removed converting said applied resin into a water-insoluble phase by forming a free resin base through treating the impregnated material with a basic material.

3. A process for imparting water repelling and other desirable properties to fibrous materials which comprises forming an aqueous solution of a water soluble salt of a basic amine-aldehyde type resin composed of the condensation product of about 4 mols of formaldehyde with about 1 mol of dicyanamide and with about 2 mols of a guanyl urea chloride, impregnating said material with the formed aqueous solution of said resin, and thereafter imparting the aforesaid properties by chemically converting the formed resin into an insoluble stage by combining with an alkali so as to remove the acid groups of the salt component of said resin.

4. A process for imparting water repelling and other desirable properties to fibrous materials which comprises forming a warm aqueous solution of a water soluble salt of a basic amine-aldehyde type resin composed of the condensation product of about 4 mols of formaldehyde with about 1 mol of dicyanamide and with about 2 mols of guanyl urea chloride, and thereafter imparting the aforesaid properties by chemically converting the formed resin into an insoluble stage by reacting with an alkali to displace acid groups of the salt component of said resin.

5. A process for coating and impregnating material comprising impregnating the material with an aqueous solution of a water soluble salt of a basic amine-aldehyde type resin composed of the condensation product of formaldehyde with a polycyan amino resin forming compound, and with a guanylurea acid salt resin forming compound, said salt being stable during the formation of said resin, and thereafter chemically converting said resin into an insoluble state by reaction in an alkaline medium.

6. The process for coating and impregnating materials comprising impregnating the materials with an aqueous solution warmed to about 50° C. and containing about 1000 parts of water, about 15 parts by weight of concentrated hydrochloric acid and about 10 parts by weight of the condensation product of formaldehyde with a polycyan amino resin-forming compound and with a guanylurea acid salt resin-forming compound, said guanylurea salt being stable during the formation of said resin, and thereafter further treating with an inorganic base to form an insoluble resin adhering to and carried in the treated material.

7. A process for coating and impregnating materials comprising impregnating the materials with a warm aqueous solution of a water-soluble salt of a basic amine-aldehyde type resin composed of the condensation product of formaldehyde with polycyan amino resin-forming compound and with a guanylurea acid salt resin-forming compound, said salt being stable during the formation of said resin and thereafter further treating with an aqueous solution of a material of the group consisting of anion-active soaps and anion-active soap substitutes to form a water-insoluble salt of said applied resin.

8. A process for coating and impregnating materials, comprising impregnating the material with a warm aqueous solution of a salt of a basic amine-aldehyde type resin composed of the condensation product of about 4 mols of formaldehyde with about 1 mol of dicyanamide compounds and with about 2 mols of a guanylurea acid salt resin-forming compound, said salt being stable during the formation of said resin, converting the applied resin into an insoluble state by reacting with an agent adapted to displace the solubilizing acid radical of the salt component of the resin with a non-solubilizing group.

9. A process for producing improved coated and impregnated textile materials comprising impregnating the materials with an aqueous solution of a water-soluble salt of a basic amine-aldehyde type resin composed of the condensation product of about 4 mols of formaldehyde with about 1 mol of dicyandiamide and with about 2 mols of guanylurea chloride, a resin-forming compound, and after the excess solution is removed, chemically converting said applied resin into a water-insoluble phase by removing the water solubilizing acid groups of the salt component of the resin.

10. A process for coating and impregnating materials comprising impregnating the material with an aqueous solution of a water-soluble salt of a basic amine-aldehyde type resin composed of the condensation product of formaldehyde with a polycyanamino compound of the group consisting of dicyanamide and dicyandiamide and with a mineral acid salt of guanylurea, said salt being stable during the formation of said resin and thereafter forming the free resin base of said applied resin by reacting with a basic compound.

11. A process for coating and impregnating materials, comprising impregnating the materials with a warm aqueous solution of a water-soluble salt of a basic amine-aldehyde type resin composed of the condensation product of about 4 mols of formaldehyde with about 1 mol of dicyanamide and with about 2 mols of mineral acid salt of guanylurea, said salt being stable during the formation of said resin and thereafter forming an insoluble salt of said applied resin by contacting the materials and reacting the soluble resin in said materials at its salt-forming radical with a salt adapted to substitute a non-solubilizing salt-forming radical for the solubilizing salt-forming radical of the resin.

12. A process for coating and impregnating materials, comprising impregnating the materials with an aqueous solution of a water-soluble salt of a basic amine-aldehyde type resin composed of the condensation product of formaldehyde with a polycyanamino compound of the group consisting of dicyandiamide and dicyanamide and with a guanylurea acid salt resin-forming compound of the group consisting of guanylurea chloride and guanylurea sulfate, said salt being stable during the formation of said resin and after removal of excess solution, forming the free resin water insoluble base of said applied resin by reacting with a warm solution of a basic compound.

13. A textile material which has been impregnated with a condensation product formed from mixing an aqueous solution at 50° C. of a water-soluble salt of a basic amine-aldehyde type resin composed of the condensation product of formaldehyde with dicyandiamide and with a preformed mineral acid salt of guanyl urea, and from which the excess solution has been removed chemically, and the said applied resin has been converted into its water-insoluble state by the removal of the water solubilizing acid groups of the salt component of the resin.

14. A water repellant textile which has been impregnated with a warm aqueous solution of a water-soluble salt of a basic amine-aldehyde type resin composed of the condensation product of about 4 mols of formaldehyde with about 1 mol of dicyandiamide and with about 2 mols of a preformed mineral acid salt of guanyl urea, and from which the excess solution has been removed and the applied resin converted into a water-insoluble phase by forming a free resin base through treatment of the impregnated material with a basic material.

15. A textile material that has been impregnated with an aqueous solution of a basic amine-aldehyde type resin composed of the condensation product of formaldehyde with a polycyanamino compound of the group consisting of dicyandiamide and dicyanamide and with a guanyl urea acid salt resin-forming compound of the group consisting of guanyl urea chloride and guanyl urea sulfate, said salt being stable during the formation of said resin and after removal of excess solution, forming the free resin water-insoluble base of said applied resin by reacting with a warm solution of a basic compound.

WOLFGANG GÜNDEL.
ERNST GÖTTE.

REFERENCES CITED

The following references are of record in the file of this patent:

UNITED STATES PATENTS

| Number | Name | Date |
|---|---|---|
| 2,101,215 | Graves | Dec. 7, 1939 |
| 1,780,636 | Stine | Nov. 4, 1930 |
| 1,658,597 | Griffith | Feb. 7, 1928 |
| 2,111,698 | Siefert | Mar. 22, 1938 |
| 2,197,357 | Widmer | Apr. 16, 1940 |
| 2,211,709 | Zerweck | Aug. 13, 1940 |
| 2,214,067 | Peterson | Sept. 10, 1940 |
| 1,734,516 | Foulds | Nov. 5, 1929 |
| 2,284,609 | Schroy | May 26, 1942 |

OTHER REFERENCES

Ellis, Chem. of Synthetic Resins (1935), vol. 1, pp. 613, 614, 693 and 695.